No. 11,970. Reissued Feb. 18, 1902.

E. GREIL & E. AUDIGER.

ELECTRIC CONTACT OR CURRENT TAKING DEVICE.

(Application filed Aug. 9, 1901.)

Witnesses.
Robert Everett.
Dennis Sunky.

Inventors.
Ernest Greil.
Emile Audiger.
By James L. Norris.
Atty.

UNITED STATES PATENT OFFICE.

ERNEST GREIL AND EMILE AUDIGER, OF PARIS, FRANCE, ASSIGNORS, BY MESNE ASSIGNMENTS, TO NATIONAL ELECTRIC IMPROVEMENT COMPANY, OF NEW YORK, N. Y., A CORPORATION OF NEW JERSEY.

ELECTRIC CONTACT OR CURRENT-TAKING DEVICE.

SPECIFICATION forming part of Reissued Letters Patent No. 11,970, dated February 18, 1902.

Original No. 663,750, dated December 11, 1900. Application for reissue filed August 9, 1901. Serial No. 71,529.

DIVISION C.

*To all whom it may concern:*

Be it known that we, ERNEST GREIL and EMILE AUDIGER, citizens of the Republic of France, residing at 138 Faubourg St. Honoré, Paris, France, have invented certain new and useful Improvements in Electric Contacts or Current-Taking Devices, (for which Letters Patent of the United States No. 663,750 were granted us the 11th day of December, 1900, and which are surrendered for reissue in three divisions or patents,) of which the following is a specification.

This invention relates to certain new and useful improvements in electric contacts or current-taking devices for electric appliances, and more especially those intended for illuminating purposes.

The invention aims to construct an electric contact or current-taking device adapted for use in connection with electrical translating devices, such as lamps and the like; and the object thereof is to connect the leading-in wires of the translating device or lamp by a pair of conducting projections with a pair of superposed penetrable conducting bands or sheets of suitable material arranged upon a table or other support. The conducting-sheets are insulated from each other and connected to opposite terminals of a source of electricity, so that on thrusting the conducting projections of the translating device or lamp one into each sheet they make contact and the translating device or lamp is placed in circuit. Furthermore, the conducting projections secure the device in position to the table or other support.

A further object of the invention is to provide an arrangement enabling the placing of translating devices or lamps at various points and in various order within the capacity of the conductors to enable the establishment of luminous letters or signs, especially for advertising purposes, as will be described with reference to the accompanying drawings, in which—

Figure 1:
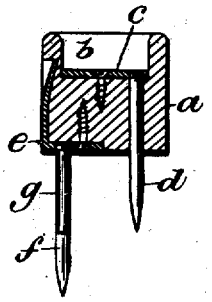
Figure 2:
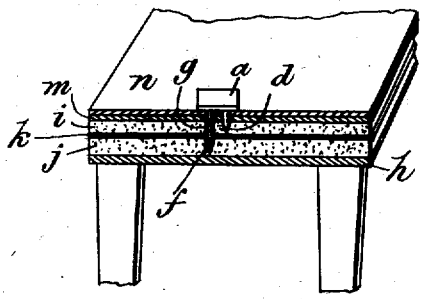

Figure 1 shows a sectional elevation of the connecting device which is adapted to penetrate the conductors for completing the circuit and securing the translating device or lamp in position. Fig. 2 represents the top structure of a table or other support constructed in accordance with our invention and provided with conducting-sheets.

Referring to the drawings by reference-letters, *a* indicates the base of our connecting device, which is constructed of suitable insulating material and provided at its top with a cavity *b*. Secured to the bottom of the cavity *b* is a metallic contact-strip *c*, to which is connected the conducting projection *d*, which extends through the block *a*. Secured to the periphery of the block *a* is a metallic contact *e*, which also engages the bottom of the block *a* and has attached thereto the conducting projection *f*, whose conducting-surface is out of line with that of the conducting projection *d* and which has its upper portion insulated by means of the sheath *g*. The contacts *c* and *e* are adapted to be in metallic connection with the leading-in wires or contacts of the translating device or lamp.

The reference-letter *h* denotes the top structure of a table or other support, whose surface is covered by a pair of conducting sheets or bands *i j*, and between the said conducting sheets or bands *i j* is interposed a sheet of insulating material *k*. By this arrangement the conducting-sheets are formed of superposed bands or sheets separated by the insulating sheet or layer *k*. It will of course be understood that at the extremities of the table the sections of the conducting-strips are suitably insulated.

Mounted upon the conducting sheet or band *i* is a sheet of asbestos *m* or other suitable material, and upon the said sheet of asbestos *m* is mounted a cover of india-rubber *n* or other suitable material.

The points of the conducting projections *d f*, these latter being disposed in different planes, as hereinbefore stated, are adapted to penetrate the rubber covering, sheet of asbestos, and the conducting sheets or bands *i j*. The projection *d* penetrates only the mass *i*, but the projection *f* penetrates the masses *i* and *j*. The insulated sheath of the projection *f* when the projections are in position extends through the conducting sheet or band *i*, insulating projection *f* therefrom.

The arrangement of conductors as superposed sheets or bands separated by an insulating layer of suitable material enables the translating device or lamp to be arranged upon any point of the conducting-sheets, and by such an arrangement not only can the lamp be placed in any desired position upon the top structure of the table or other support, but it will enable the arrangement of the translating devices or lamps in various positions to form illuminated signs, letters, and designs. The projections *d f* serve also to secure the translating device or lamp to the table or other support. The foregoing arrangement of conducting sheets or bands may be applied to partitions, floors, or the like, to which the translating devices or lamps are to be secured.

The conducting sheets or bands intended for the reception of the projections may be constructed of various materials to enable electrical communication by the penetration of the conducting projections. These sheets or bands may consist of metallic wires, thin metal sheets, lead shot, sheet-tin, plumbago, &c.

The conducting projections may be adapted directly to the base of the translating device or lamp which it is desired to place in circuit and form an integral portion of its socket, as this might be advantageous under certain conditions—as, for example, in order to rapidly form a luminous sign.

Having thus fully described our invention, what we desire to secure by Letters Patent is—

1. The combination with a plurality of electric conductors adapted to be connected respectively with the positive and negative poles of an electric generator, mounted one above the other on a table or other support and separated by a layer of insulating material, and a layer of easily-penetrable insulating material on the top of said table or support above said conductors, of a connecting device having projections thereon terminating at different levels and adapted to be inserted through said layer or penetrable insulating material to respectively engage said conductors, and insulating material on that portion of one of said projections which passes through the upper conductor.

2. The combination of a support covered by conducting-sheets, one outside the other, an insulating-sheet between the conducting-sheets, and means comprising two projecting contacts of different lengths and each adapted to penetrate one of the conducting-sheets for placing a translating device in circuit at any point on the support, the longer of said contacts being electrically separated from the outer conducting-sheet.

3. The combination of a support covered by superimposed conducting-sheets, a layer of insulating material interposed between said sheets, and means comprising two downwardly-extending contacts of different lengths and each adapted to penetrate one of the conducting-sheets for placing a translating device in circuit at any point of the support, the longer of said contacts being electrically separated from the upper conducting-sheet.

In testimony whereof we have signed our names to this specification in the presence of two subscribing witnesses.

ERNEST GREIL.
EMILE AUDIGER.

Witnesses:
EDWARD P. MACLEAN,
ANDRÉ LÉVY PICARD.